Oct. 29, 1963
I. JEPSON ETAL
3,108,531
ELECTRIC HEATING AND COOKING DEVICE
Filed May 14, 1962
4 Sheets-Sheet 1
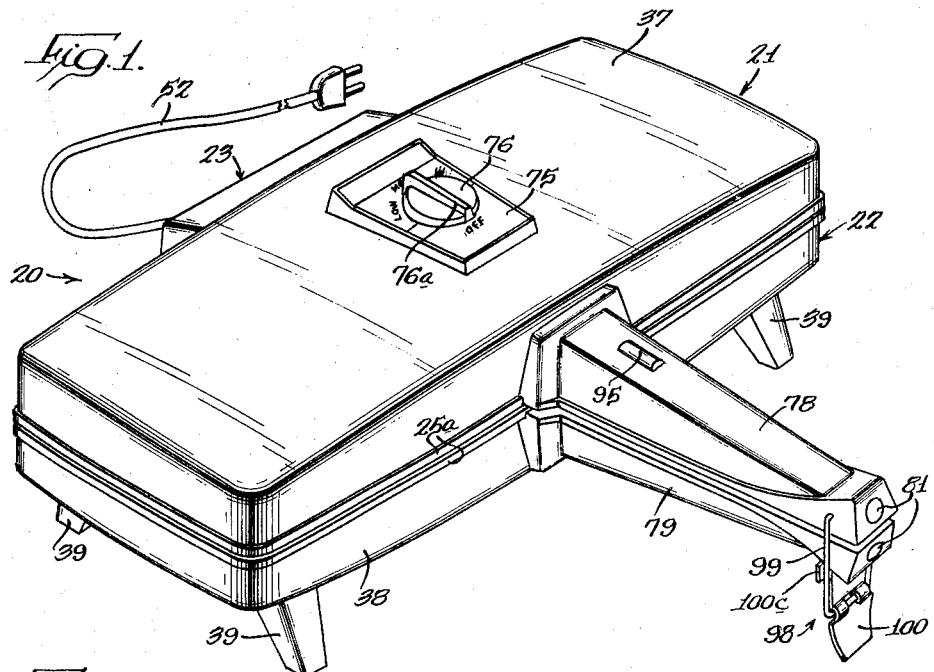
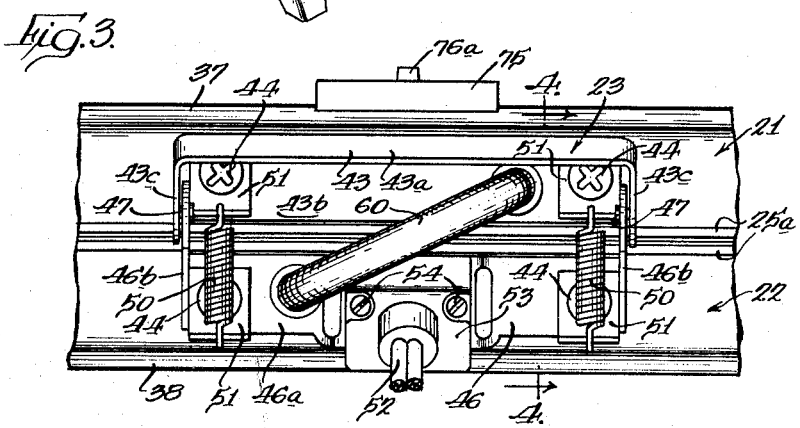
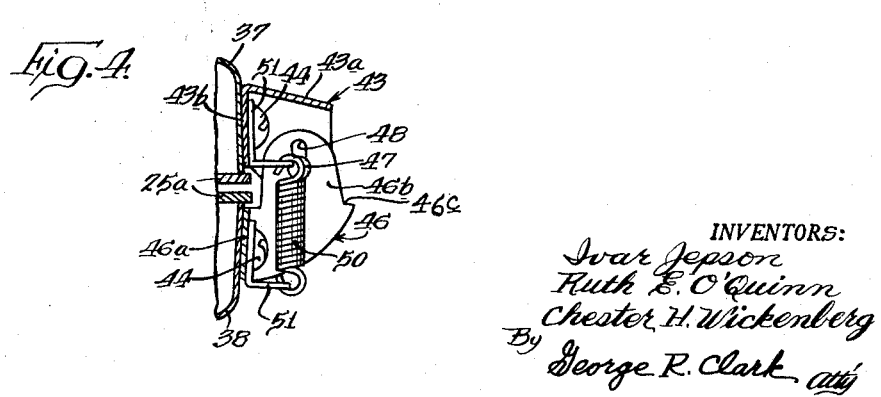
INVENTORS:
Ivar Jepson
Ruth E. O'Quinn
Chester H. Wickenberg
By George R. Clark  atty

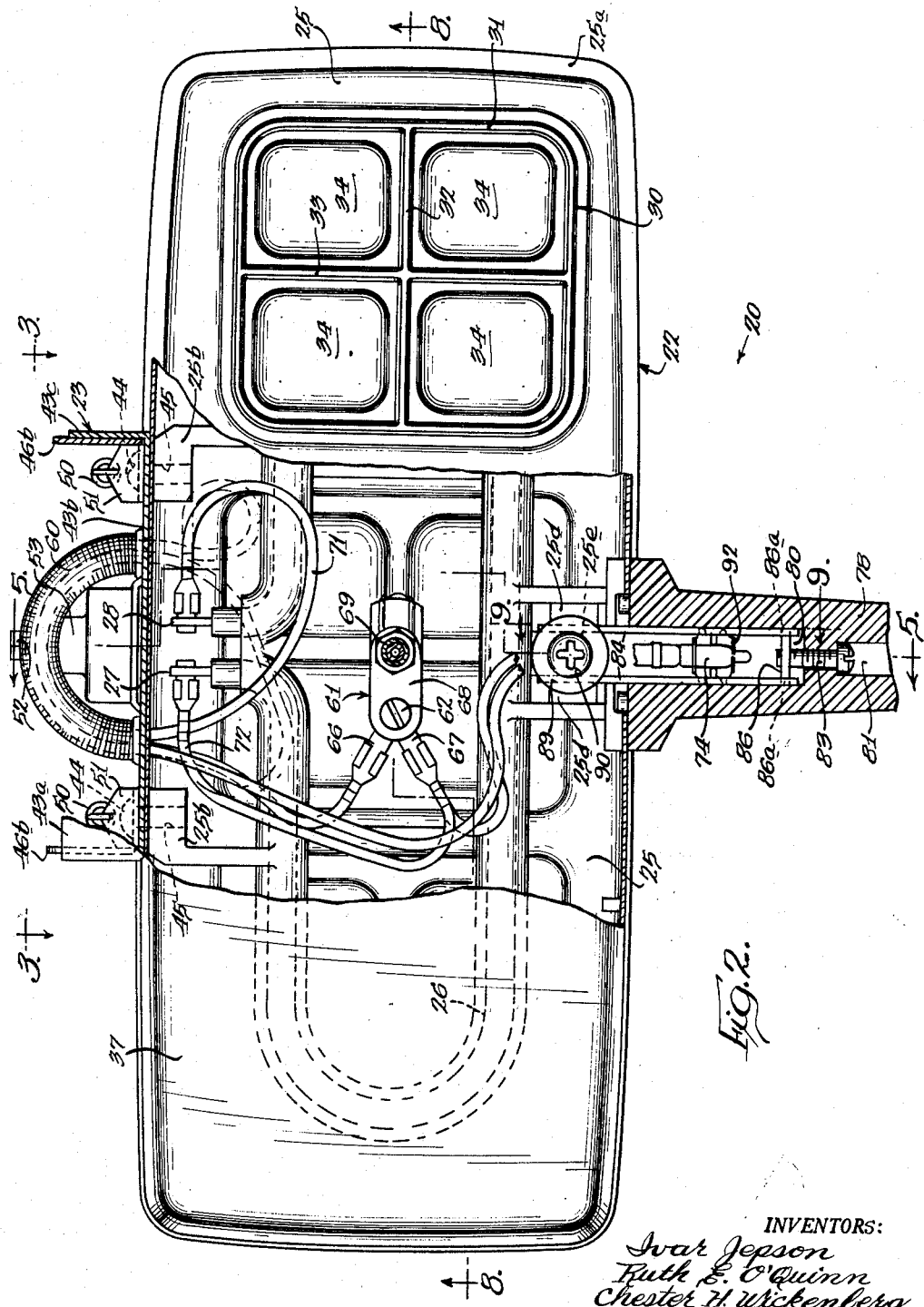

Oct. 29, 1963
I. JEPSON ETAL
3,108,531
ELECTRIC HEATING AND COOKING DEVICE
Filed May 14, 1962
4 Sheets-Sheet 3
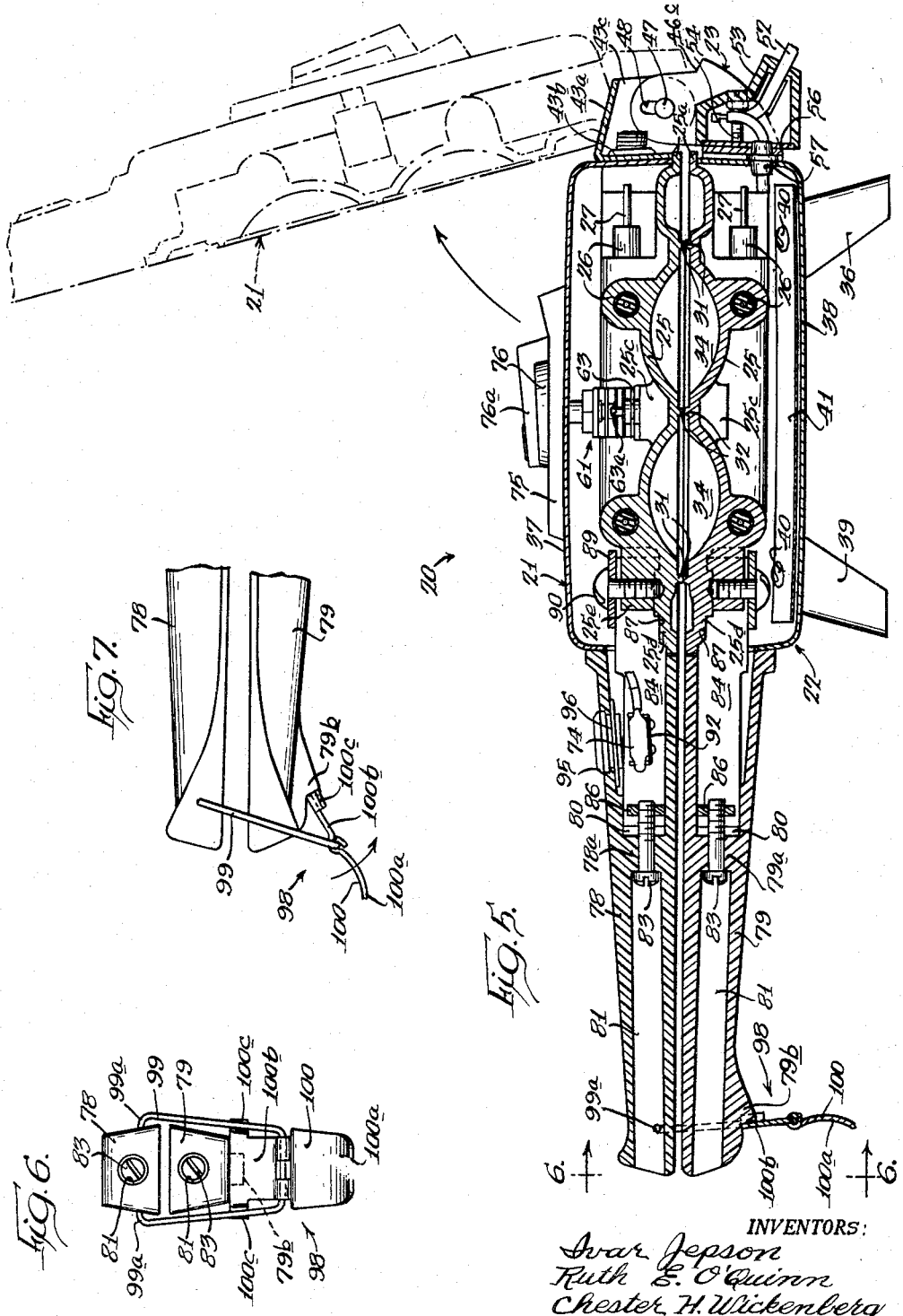
INVENTORS:
Ivar Jepson
Ruth E. O'Quinn
Chester H. Wickenberg
By George R. Clark    Att'y

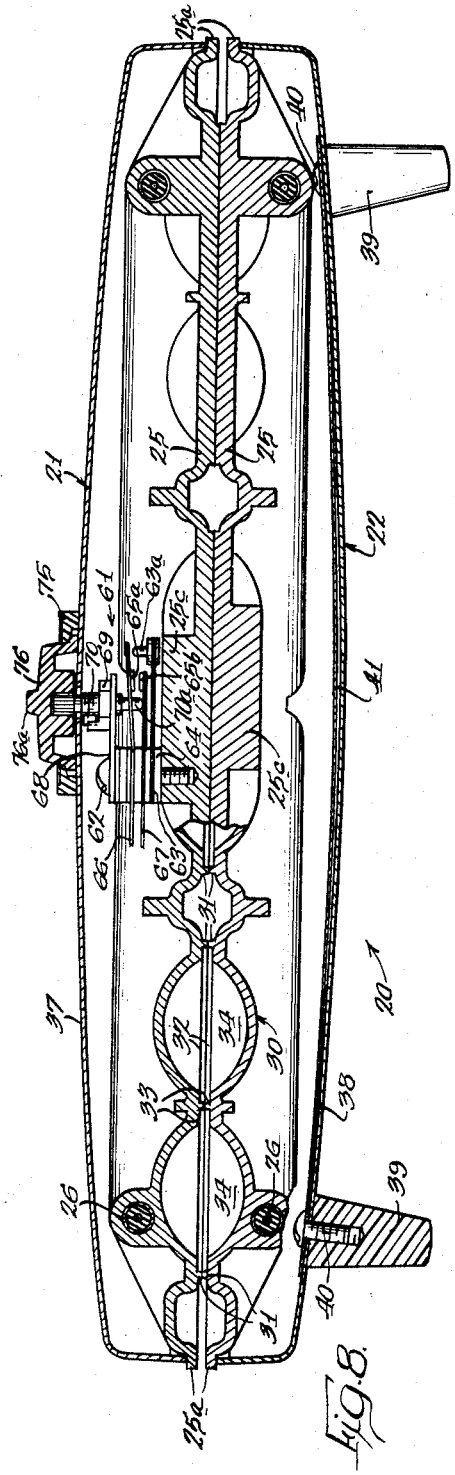

United States Patent Office 3,108,531
Patented Oct. 29, 1963

3,108,531
ELECTRIC HEATING AND COOKING DEVICE
Ivar Jepson, Oak Park, Ruth E. O'Quinn, Melrose Park, and Chester H. Wickenberg, Elgin Ill., assignors to Sunbeam Corporation, Chicago, Ill., a corporation of Illinois
Filed May 14, 1962, Ser. No. 194,468
7 Claims. (Cl. 99—331)

The present invention relates to electric heating and cooking devices and more particularly to devices for making filled toasted sandwiches from slices of bread and other ingredients. Such devices might be termed hors d'oeuvre makers.

The conventional electric bread toaster, whose principal function is to toast slices of bread, has been extensively sold throughout the world. Another commonly used heating or cooking device is the sandwich grill which grills sandwiches between heated grids or plates. The so called "cocktail hour" which often includes the serving of hors d'oeuvres has created the need for a simple and inexpensive hors d'oeuvre maker which is particularly useful for small parties to prepare a wide variety of hors d'oeuvres. An hors d'oeuvre maker should be capable of making small filled toasted sandwiches which are completely sealed at the edges thereof. It should be possible to use for the filling of these sandwiches almost any edible material whether initially cooked or uncooked. Moreover, the hors d'oeuvre maker should be easy to clean, easy and convenient to use, pleasing in appearance and foolproof in operation.

Accordingly, it is an object of the present invention to provide a new and improved heating or cooking device especially adapted to making small, hot, toasted, filled sandwiches.

It is another object of the present invention to provide an improved hors d'oeuvre maker which is capable of quickly making a variety of hot hors d'oeuvres.

It is another object of the present invention to provide a device for forming filled toasted sandwiches from slices of bread and filling material which is of simple and economical construction.

Still another object of the present invention resides in the provision of an hors d'oeuvre maker which lends itself to easy loading and unloading and includes control means for preventing overheating thereof.

It is a further object of the present invention to provide a new and improved latch means for an hors d'oeuvre maker which is simple both to latch and to release and which gradually releases any pressure built up in the material being heated or cooked.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a perspective view of a cooking device embodying the present invention shown with the heating grids latched in the cooking position;

FIG. 2 is a top plan view of FIG. 1 with certain portions cut away more clearly to illustrate the present invention;

FIG. 3 is a fragmentary view looking in the direction of the arrows 3—3 of FIG. 2, but assuming that FIG. 2 shows the complete structure;

FIG. 4 is a fragmentary sectional view taken on line 4—4 of FIG. 3;

FIG. 5 is a sectional view taken on line 5—5 of FIG. 2 assuming that FIG. 2 shows the complete structure, and showing in phantom the loading or unloading position of the cooking device;

FIG. 6 is an end view looking in the direction of the arrows 6—6 of FIG. 5 but showing only the handles and latching means;

FIG. 7 is a fragmentary side elevational view of FIG. 6 but showing the handle latching mechanism during a latching operation thereof;

FIG. 8 is a sectional view taken on line 8—8 of FIG. 2 again assuming that FIG. 2 shows the complete structure;

FIG. 9 is a fragmentary sectional view taken on line 9—9 of FIG. 2 also assuming that FIG. 2 shows the complete structure;

FIG. 10 is a sectional view taken on line 10—10 of FIG. 9 assuming that FIG. 9 shows the complete structure; and FIG. 11 is a schematic diagram of the electrical circuit of the hors d'oeuvre maker of the present invention.

Briefly, the present invention is concerned with an hors d'oeuvre maker which in some respects is similar to a sandwich toaster. In an embodiment built in accordance with the present invention, the hors d'oeuvre maker is capable of simultaneously toasting six slices of bread, making twelve individual hors d'oeuvres. A pair of grids with pockets for each individual hors d'oeuvre to be made are hingedly related in the manner of a sandwich grill and projecting handles, one from each grid, are provided with latching means for latching these grids in closed position so as to clamp the slices of bread therebetween. The edges of the pockets defining each separate hors d'oeuvre in the grid are provided with projections which compress the portions of the bread engaged thereby so that with the subsequent heating and toasting operation the peripheral edges of the hors d'oeuvres are sealed, these sealed edges being formed by the mating projections on the superimposed grids. To prevent any explosion due to gases produced during the toasting or heating operation and, perhaps, even the cooking operation of some of the sandwich filler utilized, the hinged edges of the grids are provided with means for permitting limited separation of the grids when sufficient internal pressure occurs. The latching means provided at the ends of the handles utilizes a toggle type mechanism to insure that the desired pressure can readily be applied to the material disposed within the hors d'oeuvre maker and yet insures a simple yet controlled release when the cooking operation is completed. Thermostatic control means are employed to insure that the proper temperature exists at all times.

Referring now to the drawings, there is illustrated a cooking or toasting device which may be termed an hors d'oeuvre maker, generally designated by the reference numeral 20. The hors d'oeuvre maker 20 comprises a pair of relatively movable heating units including an upper heating unit 21 and a lower heating unit 22 hingedly related by hinge means generally designated at 23. The upper and lower heating units 21 and 22 are essentially very similar. Each includes a cast grid member in which an electrical heating element is embedded. The specific appearance of the device 20 forms no part of the present invention but is disclosed in copending design application Serial No. D64,636—Cornwell, filed April 6, 1961.

As best shown in FIGS. 5 and 8 of the drawings, the upper heating unit 21 comprises a grid 25 preferably formed of cast aluminum or the like having integrally cast therein a sheathed heating element 26 arranged in the form of an elongated oval one turn loop, as best shown in FIG. 2 of the drawings. The ends of the heating element 26 are connected to spaced parallel rigid terminals 27 and 28 (FIG. 2) which as illustrated in the drawings extend laterally outward from approximately the center of one long side of the oval loop. The lower heating unit 22 includes an identical grid 25 having cast therein an identical sheathed heating element 26 with the identical terminals 27 and 28. When the heating units 21 and 22 are in the closed position shown in FIG. 1 of the drawings, the rigid terminals 27 and 28 of the heating element 26 of the upper grid are disposed immediately above the terminals 27 and 28 of the sheathed heating element 26 embedded in the lower grid.

In accordance with the present invention, the adjacent faces of the grids 25 each comprise three identical sandwich receiving sections 30, as best shown in FIG. 2 of the drawings. Each section 30 comprises an outer divider of ridgelike projection 31 in the shape of a rectangle divided into four separate areas by a pair of linear cross projections 32 and 33 so as to define four recesses of equal size within the outer projection 31, each recess being designated by the reference numeral 34. The width of projections 31, 32 and 33 at their projecting ends may all be the same, but in a device built in accordance with the present invention, the projection 31 had a width at its projecting end of the order of fifty thousandths of an inch while the projections 32 and 33 had a width at their projecting ends of the order of twenty thousandths of an inch. The reason for this discrepancy in widths is to provide a better seal and a wider stitch width at the periphery of the bread slices to prevent the escape of food material and to facilitate separation along the wider stitch line. When the hors d'oeuvre maker 20 is in the closed position, best shown in FIGS. 1, 5 and 8 of the drawings, the tops of the projections 31, 32 and 33 of the lower grid 25 are in face-to-face engagement with the ends of projections 31, 32 and 33, respectively, of the upper grid 25, and, of course, the cooperating upper and lower recesses 34 combine to form a single large recess bounded by the projections 31, 32 and 33 and the portions of the corresponding grids defined within these boundaries. The peripheral extent of projection 31 is preferably slightly less than that of the conventional bread slice. In a device built in accordance with the present invention, the dimensions of the rectangular area bounded by the projection 31 were roughly three and three-eights by three and three-quarters inches. Preferably the opposed cooking faces of the grids 25 are covered with a protective silicone coating to prevent foods from sticking thereto.

In order to provide a more pleasing appearance, as well as to house the electrical circuit and controls, the heating units 21 and 22 each include a suitable casing for housing all but the cooking faces of grids 25. As illustrated, the cooking unit 21 includes an upper casing 37 while the lower cooking unit 22 includes a lower casing 38. Each of these casings 37 and 38 comprises a shallow one piece container open at one side, the associated grid closing this open side. Each grid 25 is provided with a peripheral flange 25a which engages and overlies the rim of the associated casing 37 or 38 as the case may be.

In order that the hors d'oeuvre maker 20 may be placed on any supporting surface, suitable feet or leg 39 are provided which are secured to the lower casing 38 by suitable fastening means 40 (FIGS. 1, 5 and 8). So that the heat from the lower grid 25 is not radiated to the lower casing 38 and from there to the surface upon which the cooking device 20 is supported, a suitable heat reflector 41 (FIGS. 5 and 8) is preferably disposed within the lower casing 38 and held in place by the same fastening means 40 that hold the legs 39 to the lower casing 38. The upper surface of the reflector 41 is highly reflective so as to reflect the heat energy away from the lower casing 38.

As was pointed out above, the terminals 27 and 28 of both the upper and lower grid are superimposed on the same side of the hors d'oeuvre maker 20 and specifically these terminals are preferably adjacent the hinge assembly 23 for hingedly relating the two heating units 21 and 22. As is best shown in FIGS. 2, 3, 4 and 5 of the drawings, the hinge assembly 23 comprises an elongated upper hinge member 43 of somewhat L shape, including longitudinally extending legs 43a and 43b. The leg 43a forms a sort of horizontally disposed shelf with the other leg 43b being disposed against the rear edge of the upper casing 37. The ends of leg 43a are bent downwardly as indicated at 43c to define spaced parallel vertically disposed hinge pin supporting portions. The upper hinge member 43 is secured to upper unit 21 by suitable fastening means 44 which extend through suitable openings in hinge leg 43b and clamp the latter into face-to-face engagement with the edge of upper casing 37. Preferably the fastening means 44 engage tapped openings 45 defined in suitable projections 25b of grid 25 (FIG. 2), thereby uniting the grid 25, the associated upper casing 37 and hinged member 43 into a unitary assembly.

The hinge assembly 23 also includes a lower hinge member 46 having an elongated portion 46a adapted to be clamped against the edge of lower casing 38 by identical fastening means 44 (FIGS. 3 and 4) in the same manner as leg 43b of upper hinge member 43 is clamped to upper casing 37. Thus, the lower grid 25, lower casing 38 and lower hinge member 46 are held together as a unitary assembly. The lower hinge member 46 also includes a pair of spaced parallel vertically extending projections 46b adapted to be received between downwardly extending hinge pin supporting members 43c and in almost face-to-face engagement therewith. To pivotally related members 43c and 46b, a pair of opposed hinge pins 47 project from the former which are receivable within elongated slots 48 in members 46b. The projections 46b are provided with shoulders 46c which act as stops by engaging the portion 43a of the hinge member 43 in the open position shown in phantom in FIG. 5.

For the purpose of relieving excessive gas pressures produced in the material being cooked and also for preventing excessive forces from being applied to the hinge pins 47, there are provided in addition to the elongated slots 48 a pair of tension springs 50 which are secured to L-shaped spring supporting members 51, four of the latter being shown in FIG. 3 of the drawings. The spring supporting members 51 each have one leg of the L secured to heating units 21 or 22 by the same fastening means 44 securing hinge assembly 23 to these units. The other legs of each L-shaped spring supporting member 51 are each provided with a suitable opening for receiving the corresponding end of the associated tension spring 50. The upper ends of the tension springs are connected to the upper unit 21 at the axis of hinge pins 47 thereby being unaffected by opening or closing movement of the upper unit 21 relative to the lower unit 22. It will be apparent that these tension springs 50 will permit the upper and lower grids to move apart to the extent permitted by elongated slots 48 in the event that pressure is developed in the recesses 34 during a cooking operation. The springs, in other words, permit the heating units to function as a sort of safety valve with respect to pressures developed during heating or cooking. The springs 50 in a device built in accordance with the present invention applied approximately a ten pound force through each spring, thus compressing the bread slices at the projections 31, 32 and 33 to such an extent that the individual hors d'oeuvres produced could readily be broken apart.

In order that electrical energy may be supplied to the heating element 26 of the upper and lower grids 25, a conventional power cord 52 is provided (FIGS. 1, 2, 3, 5 and 11) which enters the lower casing 38 through a suitable junction box 53, the latter being secured by suitable fastening means 54 to the portion 46a of lower hinge member 46. Preferably a suitable insulating back plate 56 is interposed between the hinge portion 46a and the junction box 53. Moreover, a junction box insulator 57 provides a protected passageway for the electrical conductors permitting them to enter lower casing 38 for electrical connection with the heating element 26 of the lower grid 25.

Obviously, electrical energy must also be fed to the heating element 26 of the upper grid 25 and to this end electrical conductors must extend between the lower unit 22 and the upper unit 21. To protect the electrical conductors interconnecting units 21 and 22, there is provided a flexible conduit 60 effectively defined by a coiled spring, the ends of which are secured to units 21 and 22, respectively. As illustrated, one end of the coiled spring guard 60 terminates in an opening in the portion 46a of the lower hinge member 46 aligned with a corresponding opening in the lower casing 38. The other end of the spring guard 60 terminates in an opening in the portion 43b of hinge member 43 which opening is also aligned with a suitable opening in the upper casing 37. It will be apparent that pivotal movement of the upper and lower units 21 and 22, as provided by the hinge assembly 23, can readily take place and the power conductors extending between these two units are completely protected by the flexible conduit or guard 60.

In accordance with the present invention, suitable temperature control means are provided so that the grids are heated to a selected temperature and maintained at this selected temperature. To this end there is provided a temperature responsive switch assembly, generally designated at 61 (FIGS. 2, 5 and 8) having temperature responsive means disposed in good heat transfer relationship with one of the grids 25. In the illustrated embodiment, the temperature responsive switch or thermostat assembly 61 is secured to a projecting lug 25c of upper grid 25 by means of a clamping screw 62. The assembly 61 includes a bimetallic element 63 having one end thereof clamped in good heat exchange relationship with the lug 25c through a heat conductor 64. The free end of bimetallic element 63 is adapted to operate a switch 65 comprising relatively movable contacts 65a and 65b. The contact 65a might be considered the movable contact which is mounted on an upper switch leaf 66 while the contact 65b might be considered the stationary contact mounted on a lower switch leaf 67. The switch leaves 66 and 67 are supported in a stack with the bimetallic element 63 and interposed insulating and conducting members in a manner well understood in the art, the fastening means 62 securing this assembled stack of elements to the lug 25c of the upper grid 25. Included in this stack as the uppermost member thereof is a suitable rigid support member 68 for supporting a nut 69 threadedly receiving rotatable temperature adjusting member 70 having an insulating projection 70a extending through an opening in the upper switch leaf 66 and engageable with the lower switch leaf 67. By rotating the member 70 it is obvious that the position of the effectively stationary contact 65b may be adjusted relative to moveable contact 65a in any desired manner. The bimetallic element 63 is provided with an insulating projection 63a adapted, when deflected upwardly by heating, to engage an extension of the upper switch leaf 66 to move the upper contact 65a away from the stationary contact 65b thereby opening switch 65 when a predetermined selected temperature of the grids 25 has been obtained. It will be apparent that below this predetermined selected temperature, the bimetallic element will permit the switch 65 to close.

The electrical circuit, best shown in FIG. 11 of the drawings, illustrates that the two heating elements 26 of the upper and lower grids 25 are connected in series by means of a conductor 71 interconnecting terminals 28. The terminal 27 of upper grid 25 is connected by a conductor 72 to one terminal of switch 65, the other terminal of which is connected to one wire of power cord 52. The terminal 27 of the lower grid 25 is connected to the other wire of power cord 52 by a conductor 73. In order to indicate the open or closed condition of switch 65, an indicating light 74 and resistor 77 serially arranged are connected across the terminals 27 of the serially connected heating elements 26.

For the purpose of selectively positioning the temperature adjusting member 70, there is provided at the top of the upper casing 37, a suitable control knob retainer 75 and a control knob 76 which latter is drivingly connected with the rotatable member 70. Suitable indicia are provided on the control knob retainer 75, such as "Off," "Low," "Medium" and "High" to indicate the various settings of the temperature responsive device 61. The control knob 76 preferably is provided with an indicator 76a which cooperates with the indicia just described.

In order that the operator may readily cause pivotal movement between the upper and lower heating units 21 and 22, a pair of hollow elongated handle members 78 and 79 are provided which are adapted to have corresponding ends thereof secured to the associated units 21 or 22, as the case may be. These handle members 78 and 79 are in most respects identical, as is shown in FIGS. 5, 9 and 10 of the drawings, differing only in minor details. Each is molded from a suitable phenolic insulating material or the like and each includes a bracket receiving chamber 80 at the casing end thereof and a screw driver receiving chamber 81 at the opposite end thereof. These chambers are separated by a wall portion 78a, in the case of handle 78, and 79a in the case of handle 79. The wall portions 78a and 79a each include an opening therethrough for accommodating fastening means 83, the purpose of which will become apparent from the ensuing description.

For the purpose of securing handle 78 to upper unit 21 and handle 79 to lower unit 22, suitable handle brackets, one projecting from and secured to each grid 25, are provided. Since these handle brackets are identical only that associated with upper heating unit 21 will be described. As best shown in the drawings (FIGS. 2, 5, 8 and 9), each handle bracket comprises a pair of identical side members or plates 84 and a cross member or plate 86 assembled to form a U-shaped bracket with the cross member defining the bight of the U. The ends of the side plates 84 remote from cross plate 86 are secured to the centers of the sides of grids 25 directly opposite from terminals 27 and 28 and the hinge assembly 23. One edge of each side plate 84, as best shown in FIGS. 5 and 9 of the drawings, is provided adjacent the grid end thereof with a stepped notch 87 for receiving a corresponding stepped projection 25d integrally formed with the associated grid 25 whether it be the upper or the lower grid. Moreover, the grid ends of the side plates 84 are adapted to abut against an integral projection 25e of the associated grid 25, this projection being disposed between the stepped projections 25d. The side plates are, moreover, clamped to the grids 25 by a suitable clamping washer 89 and associated fastening means 90 which hold the notches 87 and projections 25d in interlocking relationship in a very simple manner, thus firmly securing the handle brackets to the associated grid. The bracket cross plate 86 is provided at each end with a tongue 86a receivable in corresponding notches 91 in side plates 84 before assembly of the side plates with the grids 25. The cross plates 86 are furthermore each provided with a tapped opening for fastening means 83.

Preferably a cradlelike lamp support 92 having tongues 92a at each end is supported in openings 93 provided in the side plates 84 of the handle bracket for securing the upper handle 78 to the casing 21, as clearly indicated in FIGS. 9 and 10 of the drawings. This cradle 92 thus supports the indicating light 74 within upper handle 78.

In assembling the handles 78 and 79 to the upper and lower heating units 21 and 22, respectively, it will be understood that the handle brackets are first secured by the washers 89 and fastening means 90 to the associated grids 25, the cross plates 86 having been assembled to the plates 84 in each case and the cradle 92 having been assembled with the handle bracket for the upper handle 78. The handle brackets will thus be projecting from the units 21 and 22 and the handles 78 and 79 are then moved into position so as to receive within the chambers 80 the associated projecting handle brackets. Fastening means 83 are then inserted in chambers 81 and caused to directly engage the tapped openings in cross plates 86, thus firmly and simply securing the handles 78 and 79 of the hors d'oeuvre maker 20. Before assembly of the upper handle 78, the indicating lamp or light 74 is suitably secured on the cradle 92.

In order that this lamp may be visible externally of the handle 78, the latter is provided in the upper surface thereof with a suitable opening 94 to accommodate a lens 95. A lens clip 96 in the form of a U-shaped spring, preferably disposed within a recess defined in lens 95, holds the latter in position.

So that material to be cooked or toasted between the upper and lower heating units 21 and 22 may be securely clamped whereby the projections 31, 32 and 33 will cause sealing of the edges of the hors d'oeuvres made with the device 20, suitable latching means 98 are provided for latching the handles 78 and 79 together and consequently latching the grids 25 into the closed position indicated in FIGS. 1 and 5 of the drawings. The latching means 98 is best shown in FIGS. 1, 5, 6 and 7 of the drawings and comprises a U-shaped bail 99 which is provided at the ends of the legs of the U remote from the bight portion thereof with trunnion-like members 99a receivable in suitable openings provided on either side and adjacent the end of the upper handle member 78. Thus, bail 99 is pivoted to the free end of handle 78. Pivotally mounted to the bight portion of the bail 99 is a toggle latch 100. This toggle latch 100 is essentially a lever pivoted at its intermediate portion so as to define an actuating portion 100a and a latching portion 100b. The end of the latching portion 100b is adapted to engage a latching abutment 79b on the underside of lower handle 79, preferably integrally molded with the handle.

When it is desired to latch the hors d'oeuvre maker 20 in the toasting or cooking position, the latching means 98 is moved so that the end of the latching portion 100b of the latch 100 engages the shoulder or abutment 79b, as best shown in FIG. 7 of the drawings. The operator then applies a force as indicated by the arrow in FIG. 7 of the drawings to the actuating portion 100a of toggle latch 100, moving the toggle to the over center position indicated in FIGS. 1, 5 and 6 of the drawings. This toggle type latching means 98 provides a mechanical advantage so that the operator is not required to apply so much direct force in latching the device 20 in closed position which requires compressing the material to be cooked or heated. Of course, the relatively long handles 78 and 79 in themselves provide substantial leverage. The toggle latch 98 furthermore, upon releasing the same, permits a slight initial separation of the grids to release built up pressures before the grids 25 can separate any substantial amount. To limit overcenter movement of the toggle latch 100 during the latching operation, the latching portion 100b thereof is provided with a pair of lateral projections 100c which engage the bail 99 in the overcenter position thereof. The latching means 98 can be readily released by mere actuation of the actuating portion 100a in the direction opposite that of the arrow shown in FIG. 7 of the drawings.

In view of the detailed description included above, the operation of the hors d'oeuvre maker 20 of the present invention will readily be understood by those skilled in the art. When it is desired to make hors d'oeuvres, the power cord 52 is plugged into a suitable wall outlet or the like and heating of the upper and lower grids 25 will occur to a preselected temperature depending upon the setting of the control knob 76. The indicating light 74 will become deenergized when the proper temperature of the grids is obtained. Sandwiches are preferably made of two slices of bread with a quantity of filling material positioned therebetween in four separate piles, one adjacent each of the four corners of the superimposed bread slices. In a device built in accordance with the present invention, a measuring teaspoon or the equivalent of filling material, such as cheese, meat or any other edible material is used. The second slice of bread is superimposed over the first slice after the filling material has been placed on the lower slice. Three such sandwiches can be placed over the three areas 30 provided by the sandwich toaster 20 of the present invention while the unit is in the open position shown in phantom in FIG. 5 of the drawings. Thereafter the upper heating unit 21 is moved to the position shown in FIG. 1 of the drawings and the latch means 98 is used to clamp the heating units 21 and 22 in closed position. Within a very short period of time, such as a minute or two, the cooking operation will be completed and the filled sandwiches may be removed and can be broken into small squares by virtue of the sealing and indentations provided by the ridges 31, 32 and 33.

While there has been shown and described a single embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. In a heating device, a heating member having an electric heating element embedded therein, a U-shaped bracket secured to said member, said bracket including a pair of identical side plates and a cross plate, said cross plate defining the bight of said U-shaped bracket and including a projecting tongue at each end received in a cooperating opening in the adjacent side plate near one end thereof, means defining a notch in one edge of each of said side plates adjacent the other ends thereof, cooperating projections on said member received in the notches of each of said side plates, and a single clamping screw holding said side plates against said member with the projections received in said notches.

2. The heating device of claim 1 wherein there is provided an insulating elongated handle having a chamber defined in one end receiving said U-shaped bracket, and fastening means securing said handle to said bracket.

3. In a heating device, a heating member having an electric heating element embedded therein, temperature responsive control means in heat exchange relationship with said member, said temperature responsive control means including a switch and manually adjustable means for selecting the temperature at which said switch is opened, circuit means electrically connecting said switch and said heating element in series, a U-shaped bracket secured to said member, said bracket including a pair of identical side plates and a cross plate, said cross plate defining the bight of said U-shaped bracket and including a projecting tongue at each end received in a cooperating opening in the adjacent side plate near one end thereof, means defining a notch in one edge of each of said side plates adjacent the other ends thereof, cooperating projections on said member received in the notches of each of said side plates, and a single clamping screw holding said side plates against said member with the projections received in said notches.

4. In a heating device, a pair of hingedly related heating grids each including an electric heating element embedded in the associated grid, temperature responsive control means in heat exchange relationship with one of said grids, said temperature responsive control means including a switch and manually adjustable means for selecting the temperature of said one grid at which said switch is opened, circuit means electrically connecting said switch and the heating element in each grid in series, a U-shaped bracket secured to each grid, each U-shaped bracket including a pair of identical side plates and a cross plate, said cross plate defining the bight of said U-shaped bracket and including a projecting tongue at each end received in a cooperating opening in the adjacent side plate near one end thereof, means defining a notch in one edge of each of said side plates adjacent the other ends thereof, cooperating projections on each of said grids received in the notches of each of the associated side plates, and a single clamping screw holding said side plates of each U-shaped bracket against the associated grid with the projections received in said notches of the associated U-shaped brackets.

5. An hors d'oeuvres maker comprising an upper and a lower heating unit, the upper unit overlying the lower unit during heating operation, means hingedly relating said units including hinge means secured to corresponding edges of said units and having a lost motion connection, each heating unit comprising an identical heating grid defining a plurality of heating areas having recesses for forming and heating hors d'oeuvres, an upper elongated handle of insulating material having one end secured to the edge of the upper heating unit in direct engagement therewith opposite the edge to which said hinge means are secured, a lower elongated handle of insulating material projecting from the corresponding edge of the lower heating unit and having one end secured to said corresponding edge in direct engagement therewith, each of said handles including a chamber defined therein at the secured ends thereof, means securing each of said handles to its respective heating unit including a pair of brackets secured to each of said units and received in the chamber of the corresponding handle so as to be completely enclosed within said handles, means securing said handles to said brackets, and latching means at the other ends of said handles for latching said units in closed position, and tension spring means for biasing the hinged sides of said units towards each other, said latching means including means providing for a gradual release thereof to permit the escape of pressures built up in the material being heated before complete release of said latching means.

6. An hors d'oeuvre maker comprising an upper and a lower heating unit, the upper unit overlying the lower unit during heating operation, means hingedly relating said units including hinge means secured to corresponding edges of said units, each heating unit comprising an identical heating grid defining a plurality of heating areas having recesses for forming and heating hors d'oeuvres, each grid having an oval-shaped sheathed heating element embedded therein, said heating elements having terminals projecting in closely spaced relationship laterally from the grid in the plane of the oval and from near the middle of one long side of the oval, said terminals for the heating element of the upper unit directly overlying the terminals of the heating element of the lower unit during said heating operation, an upper elongated handle of insulating material having one end secured to the edge of the upper heating unit in direct engagement therewith opposite the edge to which said hinge means are secured, a lower elongated handle of insulating material projecting from the corresponding edge of the lower heating unit and having one end secured to said corresponding edge in direct engagement therewith, each of said handles including a chamber defined therein at the secured ends thereof, means securing each of said handles to its respective heating unit including a pair of brackets secured to each of said units and received in the chamber of the corresponding handle so as to be completely enclosed within said handles, means securing said handles to said brackets, and latching means at the other ends of said handles for latching said units in closed position.

7. In a heating device, the combination of an upper and a lower heating unit, means for hingedly relating said units, a first elongated handle secured to and projecting from the upper heating unit, a second elongated handle secured to and projecting from the lower heating unit, said handles having their longitudinal axes disposed in spaced parallel relationship when said heating units are in closed position with the first handle overlying said second handle, means for latching said units in closed position comprising a U-shaped wire bail member having an open end, two legs, and a bite portion connecting the two legs, the open end of the bail member being fixedly pivoted to the end of the first handle and its bite portion being pivotable over the end of the second handle to be positioned under the second handle, a lever pivoted on the bite of the bail member and having a handle portion on one side of the pivot and a latch portion on the other side of the pivot formed to pass between the legs of the bail member, bearing means on the underside of said second handle formed to engage with said latch portion, and stop means on said lever offset from the plane of the latch portion and positioned to abut a leg of said bail member and limit the movement of the latch portion between the legs of the bail member, whereby said handles can be locked together by pivoting said bail member over the end of the second handle, engaging said bearing means and latch portion, and pivoting said lever relative to said bail member to pass said latch portion between the legs of said bail member until said stop means abuts the leg of said bail member.

References Cited in the file of this patent

UNITED STATES PATENTS

| | | |
|---|---|---|
| 1,455,133 | Downs | May 18, 1923 |
| 1,718,260 | Shaffer | June 25, 1929 |
| 1,945,430 | Garrett | Jan. 30, 1934 |
| 1,951,009 | Davisson et al. | Mar. 13, 1934 |
| 1,969,361 | Fajen | Aug. 7, 1934 |
| 2,146,171 | Burch | Feb. 7, 1939 |
| 2,152,208 | Nelson | Mar. 28, 1939 |
| 2,267,387 | Winborne | Dec. 23, 1941 |
| 2,275,280 | Belden | Mar. 3, 1942 |
| 2,463,439 | Strietelmeier | Mar. 1, 1949 |
| 2,582,692 | Funke | Jan. 15, 1952 |
| 2,725,460 | Braski et al. | Nov. 29, 1955 |
| 2,786,928 | Roll et al. | Mar. 26, 1957 |
| 3,034,402 | Alberetti | May 15, 1962 |

FOREIGN PATENTS

| | | |
|---|---|---|
| 1,179,451 | France | Dec. 22, 1958 |